(No Model.) 2 Sheets—Sheet 2.
P. C. BURHANS.
LAWN MOWER.
No. 605,074. Patented June 7, 1898.
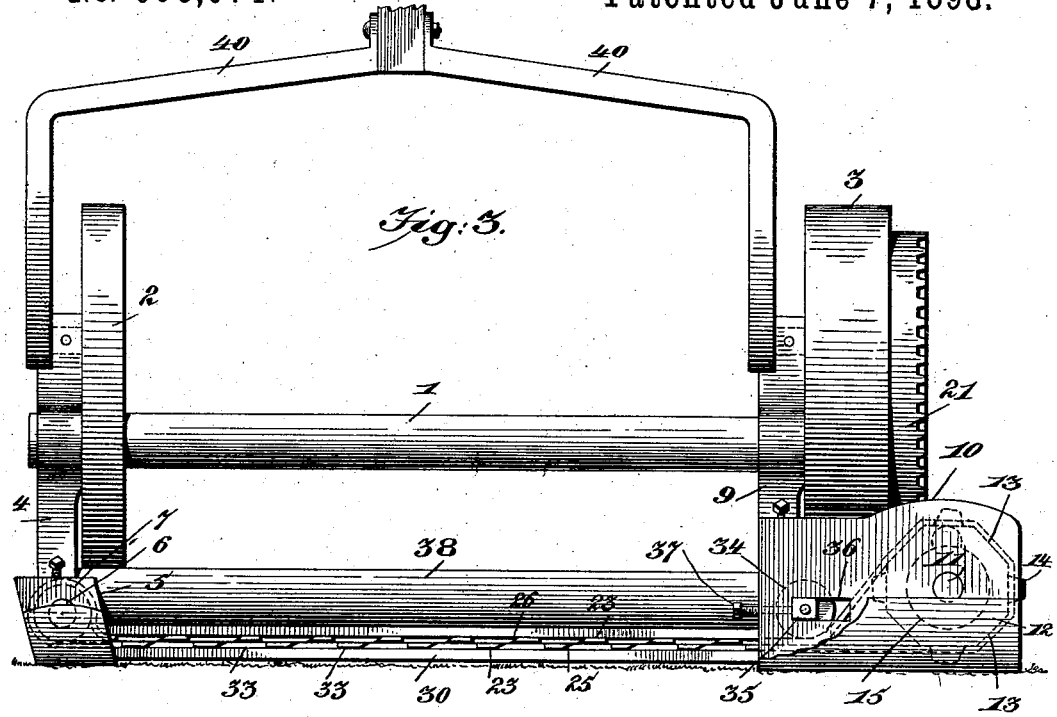
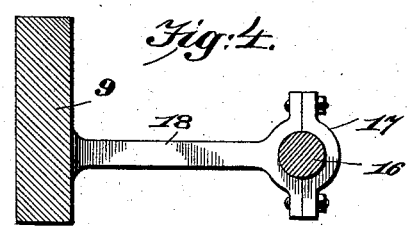
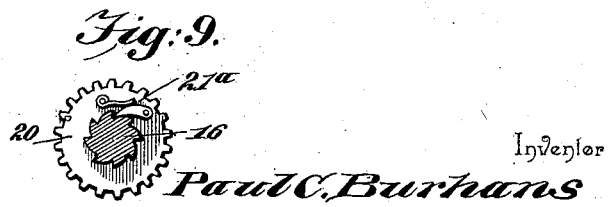
Witnesses
H. T. Dieterich
Edwin Cruse
Inventor
Paul C. Burhans
By his Attorneys,
C. A. Snow & Co.

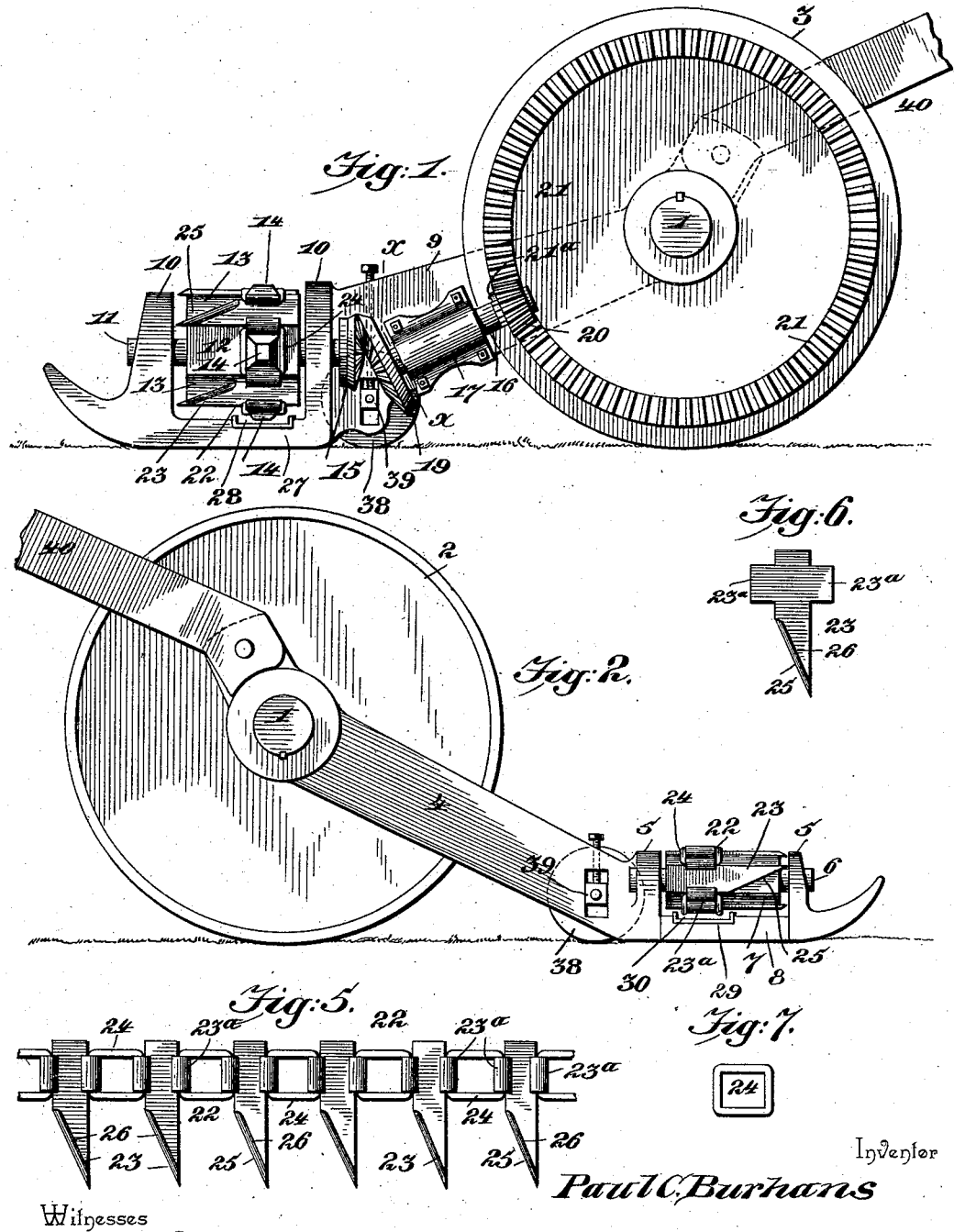

UNITED STATES PATENT OFFICE.

PAUL C. BURHANS, OF SEDGWICK, KANSAS, ASSIGNOR OF ONE-HALF TO WILLIAM FINN, OF SAME PLACE.

LAWN-MOWER.

SPECIFICATION forming part of Letters Patent No. 605,074, dated June 7, 1898.

Application filed April 21, 1897. Serial No. 633,119. (No model.)

*To all whom it may concern:*

Be it known that I, PAUL C. BURHANS, a citizen of the United States, residing at Sedgwick, in the county of Harvey and State of Kansas, have invented a new and useful Lawn-Mower, of which the following is a specification.

This invention relates to lawn-mowers, its object being to provide a machine of this character with an endless cutter-chain and with suitable gearing between one of the draft-wheels of the machine and the cutter-chain by which the latter will be continuously driven when the machine is moved forward and will be inactive when the machine is moved backward.

With this and other objects in view the invention consists of the several details of construction and combination of parts hereinafter fully described, and then particularly pointed out in the claims.

In the drawings, Figure 1 is an end elevation of a mowing-machine made in accordance with my invention. Fig. 2 is a similar view looking at the opposite end of the machine. Fig. 3 is a front view. Fig. 4 is a sectional view of a portion of the machine, taken on the line *x x* of Fig. 1. Fig. 5 is a plan view of a section of the cutter-chain. Fig. 6 is a plan view of one of the knives detached, showing the form of the knives before they are made up into the cutter-chain. Fig. 7 is a similar view of one of the connecting-links detached. Fig. 8 is a sectional view of the cutter-chain and its guides. Fig. 9 is a view of a detached detail.

Similar reference-numerals indicate similar parts in the several figures.

1 indicates the axle, and 2 and 3 the draft-wheels, which are keyed or otherwise secured to the axle to turn with it. On the end of the axle outside the wheel 2 an arm 4 is pivoted, and this arm extends downwardly and forwardly in front of the wheel 2 and is provided at its front end with upwardly-extending spaced ears 5, which ears serve as bearings for the spindle 6 of a roller 7. The lower ends of the ears 5 are connected together by a plate 8, and the axis of the roller 7 is at a right angle to that of the axle 1.

9 indicates an arm which is pivoted near one end on the axle 1 immediately inside the draft-wheel 3. This arm extends downwardly and forwardly in front of the wheel 3 and is provided with upwardly-extending spaced ears 10, which ears also extend laterally from the arm 9 in front of the wheel 3. A shaft 11 is journaled in the ears 10, and a roller 12 is keyed or otherwise secured to the shaft 11 between the ears 10. This roller is provided with flat faces on its periphery, as indicated at 13, and with a series of sprockets 14. The end of the shaft 11 which is nearest to the wheel 3 projects beyond its bearing and is provided with a bevel-gear 15. A shaft 16 is journaled in a suitable bearing 17, which is formed on the end of an arm 18, projecting laterally from the outer face of the arm 9. This shaft carries at one end a beveled gear 19, which meshes with the gear 15, and at its other end a pinion 20, which meshes with teeth 21, formed on the outer face of the wheel 3. The pinion 20 is loosely mounted upon the shaft 16, and a ratchet-and-pawl mechanism (indicated by 21ª) is provided in order that the shaft 16 will be turned when the pinion 20 is rotated in one direction, but it will not turn when the said pinion is moved in the opposite direction. By this arrangement when the lawn-mower is pushed in a forward direction the shaft 16 will be rotated and impart movement to the roller 12; but when the lawn-mower is moved backwardly the shaft 16 will not be turned in its bearings, and consequently the roller 12 will have no rotary movement.

22 indicates the endless cutter-chain, which, as shown, consists of a series of knives 23, connected together by links 24. Each of the knives is provided with an inclined cutting edge 25, which cutting edge is formed by making a bevel 26 on one face of the knife. As is clearly shown in Fig. 6, the knives are formed with laterally-projecting wings 23ª on their shank portions, which wings are adapted to be folded over to form loops for the reception of the links 24. The links 24 are rectangular, and thereby hold the knives in parallel relation to each other. The endless cutter-chain works around the rollers 12 and 7, and the sprockets 14 on the roller 12 enter the links 24, and when the roller 12 is rotated the chain will be positively driven. The flat faces 13 on the periphery of the roller 12 will also aid in driving the chain and prevent any slipping or lost motion of the chain.

The plate 27, which connects the lower ends of the ears 10, is provided with a recess 28, and the plate 8 at the other end of the machine is provided with a similar recess 29. In these recesses the ends of the guideway 30 for the cutter-chain are supported and firmly secured therein by means of rivets or other suitable fastening devices. This guideway extends transversely across the machine and serves as a support and guide for the chain cutter in its passage between the rollers 7 and 12. The guideway is formed of twin upper and lower sections substantially U shape is cross-section, and each section is provided at its rear side with an integral horizontally-extending flange 31, and the two sections are firmly secured together by means of bolts or rivets 32, which pass through the flanges 31. The front side of each of the sections is shorter than its rear side, thereby leaving an open space 33 between them, and through this open space the cutting portions of the knives will project, while the shanks of the knives and the connecting-links will be confined within the guideway. Within the guideway the upper and lower portions of the cutter-chain will work in frictional contact with each other, and the chain is so mounted that the flat faces of the knives will be in contact with each other.

34 indicates an idle-roller the spindles of which are journaled in boxes 35, which are adjustable in the horizontally-disposed slotted openings 36, formed in the ears 10. A set-screw 37 is mounted in each of the ears to engage the boxes 35 to effect the adjustment of the roller 34. The roller 34 is so arranged that it will guide the cutter-chain into the guideway 30 as it passes off the roller 12. The roller 34 will also serve to take up any slack in the cutter-chain.

38 represents a supporting-roller for the cutting mechanism, which roller extends transversely across the machine. The journals of this roller are supported in bearings 39, which are vertically adjustable on the inner faces of the arms 4 and 9, and by adjusting the roller 38 the cutting mechanism may be elevated or lowered, as desired, in order that the grass may be cut long or short, as preferred.

40 indicates the handle-fork, which is pivotally connected to the upper ends of the arms 4 and 9, respectively. The advantage of having the handle-fork pivotally connected to the arms 4 and 9 in rear of their pivotal connection to the axle is that the handle will adjust itself vertically without interfering with the cutting mechanism when grasped by a person, irrespective of his height, so that any person can push the mower forward in the most convenient manner; also, the cutting mechanism will be free to ride over uneven ground without jerking the handle up and down, which is a frequent source of annoyance in propelling the ordinary lawn-mower.

From the above description it will be seen that a cutting-machine made in accordance with my invention will move only in one direction and that it will consequently be much easier to drive than machines in which the cutters are reciprocated.

In operating the machine the wheel 2 will be toward the standing grass, and as the chain cutter is effective in operation within a very short distance of this end of the machine it will be seen that the grass can be cut up very close to fences or trees.

Another advantage which my machine will possess over those having rotary cutting-blades is that grass of any length may be cut. It is well known that the ordinary mowing-machine in which the rotary cutting-blades are used will become choked when an attempt is made to cut long grass, and this objection will be entirely absent in a machine constructed in accordance with my invention.

It will be understood that changes in the form, proportion, and minor details of construction may be resorted to without departing from the spirit or sacrificing any of the advantages of this invention.

Having thus described the invention, what I claim is—

1. In a lawn-mower, the combination with the axle and the draft-wheels secured thereto, one of said draft-wheels being also a driving-wheel, of an arm pivoted on the axle adjacent to the inner face of the driving-wheel and extending down in front thereof and having spaced ears extending laterally therefrom across and beyond the outer face of the wheel, a sprocket-wheel journaled between said spaced ears, an arm pivoted on the axle outside of the other draft-wheel and having spaced ears at its forward end, a roller journaled between said ears, an endless cutter-chain mounted on the said sprocket-wheel and roller, a guide for the chain extending across between the arms and secured at its ends between the spaced ears of the respective arms, and gearing interposed between the driving-wheel and said sprocket-wheel to drive the chain, substantially as described.

2. In a lawn-mower, the combination with the axle and the draft-wheels secured thereto, one of said draft-wheels having teeth on its outer face, of an arm pivoted on the axle adjacent to the inner face of the toothed draft-wheel and extending down in front thereof and having spaced ears extending laterally therefrom across and beyond the outer face of the wheel, a sprocket-wheel journaled between said spaced ears, the shaft of said sprocket-wheel having a gear exterior of the rear ear, a bracket extending laterally from the said arm across the toothed draft-wheel, a shaft journaled in said bracket and having gears on its ends meshing with the gear on the sprocket-shaft and the teeth on the draft-wheel respectively, an arm pivoted on the axle outside of the other draft-wheel and having spaced ears at its forward end, a roller journaled between said ears, an endless cutter-chain mounted on the said sprocket-wheel and roller, and a guide for the chain extending across between the spaced ears of the respective arms, substantially as described.

3. In a lawn-mower, the combination with the axle and the draft-wheels secured thereto, one of said draft-wheels being also a driving-wheel, of an arm pivoted on the axle adjacent to the inner face of the driving-wheel and extending down in front thereof and having spaced ears extending laterally therefrom across and beyond the outer face of the wheel, said ears each having a horizontal slot extending transversely of the machine, bearing-blocks adjustably supported in said slots, an idle-roller journaled in said blocks, a sprocket-wheel journaled between said spaced ears, an arm pivoted on the axle outside of the other draft-wheel and having spaced ears at its forward end, a roller journaled between said ears, an endless cutter-chain mounted on the said sprocket-wheel and roller, and running under the idle-roller, a guide for the chain extending across between the arms and secured at its ends between the spaced ears of the respective arms, and gearing interposed between the driving-wheel and said sprocket-wheel to drive the chain, substantially as described.

In testimony that I claim the foregoing as my own I have hereto affixed my signature in the presence of two witnesses.

PAUL C. BURHANS.

Witnesses:
 V. R. PARKER,
 H. W. DICKINSON.